(12) United States Patent
Mizumoto et al.

(10) Patent No.: US 12,327,483 B2
(45) Date of Patent: Jun. 10, 2025

(54) LANDING INFORMATION DETERMINATION APPARATUS, LANDING INFORMATION DETERMINATION SYSTEM, LANDING INFORMATION DETERMINATION METHOD, AND COMPUTER-READABLE MEDIUM

(71) Applicant: NEC Corporation, Tokyo (JP)

(72) Inventors: Hisashi Mizumoto, Tokyo (JP); Toshiaki Yamashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 253 days.

(21) Appl. No.: 18/007,547

(22) PCT Filed: Jun. 3, 2020

(86) PCT No.: PCT/JP2020/021962
§ 371 (c)(1),
(2) Date: Dec. 1, 2022

(87) PCT Pub. No.: WO2021/245844
PCT Pub. Date: Dec. 9, 2021

(65) Prior Publication Data
US 2023/0196930 A1 Jun. 22, 2023

(51) Int. Cl.
*G08G 5/54* (2025.01)
*B60L 50/60* (2019.01)
(Continued)

(52) U.S. Cl.
CPC ............. *G08G 5/54* (2025.01); *B60L 50/60* (2019.02); *B60L 53/00* (2019.02); *B64D 27/24* (2013.01);
(Continued)

(58) Field of Classification Search
CPC .... G08G 5/025; G08G 5/0034; G08G 5/0078; B64U 10/14; B64U 70/90; B64U 2201/10
See application file for complete search history.

(56) References Cited

FOREIGN PATENT DOCUMENTS

| JP | 2018-188122 A | 11/2018 |
|----|---|---|
| JP | 2019-064545 A | 4/2019 |

(Continued)

OTHER PUBLICATIONS

Translated (Year: 2019).*

(Continued)

*Primary Examiner* — Huan Le
(74) *Attorney, Agent, or Firm* — Sughrue Mion, PLLC

(57) ABSTRACT

A landing information determination apparatus according to this example embodiment includes an acquisition unit, a determination unit, and a communication unit. The acquisition unit acquires, for each of a plurality of landing places each including a facility on which an aircraft capable of autonomously flying can land, aircraft information being information concerning the aircraft flying in a surrounding area of a landing place, and place information being information concerning the landing place. The determination unit determines a landing place for each of the aircrafts and a flight path to the landing place, based on the aircraft information for each of the aircrafts, and the place information for each of the landing places, which are acquired by the acquisition unit. The communication unit transmits information indicating the landing place and the flight path for each of the aircrafts, which are determined by the determination unit, to the corresponding aircraft.

12 Claims, 6 Drawing Sheets

(51) Int. Cl.
  *B60L 53/00*   (2019.01)
  *B64D 27/24*   (2024.01)
  *B64U 10/14*   (2023.01)
  *B64U 101/00*  (2023.01)
  *G08G 5/32*   (2025.01)
  *G08G 5/72*   (2025.01)

(52) U.S. Cl.
  CPC ............... *B64U 10/14* (2023.01); *G08G 5/32* (2025.01); *G08G 5/723* (2025.01); *B60L 2200/10* (2013.01); *B64U 2101/00* (2023.01); *B64U 2201/10* (2023.01)

(56) References Cited

FOREIGN PATENT DOCUMENTS

| | | | | | |
|---|---|---|---|---|---|
| JP | 2019-123495 | A | | 7/2019 | |
| JP | 2019179422 | A | * | 10/2019 | ............... G05D 1/10 |
| WO | WO-2019064329 | A1 | * | 4/2019 | ............. B64C 13/18 |
| WO | 2019/135271 | A1 | | 7/2019 | |

OTHER PUBLICATIONS

Translated JP (Year: 2019).*
JP Office Action for JP Application No. 2022-529223, mailed on Oct. 17, 2023 with English Translation.
International Search Report for PCT Application No. PCT/JP2020/021962, mailed on Sep. 1, 2020.

* cited by examiner

LANDING INFORMATION DETERMINATION APPARATUS, LANDING INFORMATION DETERMINATION SYSTEM, LANDING INFORMATION DETERMINATION METHOD, AND COMPUTER-READABLE MEDIUM

This application is a National Stage Entry of PCT/JP2020/021962 filed on Jun. 3, 2020, the contents of all of which are incorporated herein by reference, in their entirety.

TECHNICAL FIELD

The present disclosure relates to a landing information determination apparatus, a landing information determination system, a landing information determination method, and a computer-readable medium.

BACKGROUND ART

Patent Literature 1 describes a reservation system for an unmanned aircraft. The reservation system includes the unmanned aircraft with a battery, power supply apparatuses that supply electric power to the unmanned aircraft, a flight management apparatus, a flight plan generation apparatus, and a terminal. The flight management apparatus receives aircraft information concerning the unmanned aircraft, battery information concerning the battery, and power supply apparatus information concerning the power supply apparatuses, and manages flight of the unmanned aircraft. The flight plan generation apparatus generates a flight plan for the unmanned aircraft, based on information including the aircraft information, the battery information, and the power supply apparatus information from the flight management apparatus. The terminal reserves the unmanned aircraft and the power supply apparatus, based on the flight plan. The flight plan generation apparatus generates a flight path from a departure point to a destination via the power supply apparatus, and the terminal displays information concerning the power supply apparatus as a via-point on the flight path generated by a flight path generation apparatus.

CITATION LIST

Patent Literature

Patent Literature 1: International Patent Publication No. WO2019/135271

SUMMARY OF INVENTION

Technical Problem

An aircraft such as an unmanned aircraft requires a power source, and the power source has a limit, and thus, a landing place may need to be changed according to various situation changes in a surrounding region such as an environmental change in weather and the like, and flying of a suspicious aircraft. Thus, it is desirable to manage landings to both of an unchanged original landing place and a changed landing place, according to such a situation change. However, the reservation system described in Patent Literature 1 cannot cope with a situation change in a surrounding area of each of a plurality of landing places.

The present disclosure has been made in order to solve the above-described problem, and an object thereof is to provide a landing information determination apparatus, a system, a method, and a readable medium that are made in order to solve the above-described problem and that enable information concerning landings of a plurality of aircrafts to be changed according to a situation change in a surrounding area of each of a plurality of landing places.

Solution to Problem

A landing information determination apparatus according to a first aspect of the present disclosure includes: an acquisition unit configured to, for each of a plurality of landing places each including a facility on which an aircraft capable of autonomously flying can land, acquire aircraft information being information concerning the aircraft flying in a surrounding area of a landing place, and place information being information concerning the landing place; a determination unit configured to determine a landing place for each of the aircrafts and a flight path to the landing place, based on the aircraft information for each of the aircrafts and the place information for each of the landing places, which are acquired by the acquisition unit; and a communication unit configured to transmit information indicating the landing place and the flight path for each of the aircrafts, which are determined by the determination unit, to the corresponding aircraft.

A landing information determination apparatus according to a second aspect of the present disclosure includes: an acquisition unit configured to, for each of a plurality of landing places each including a facility on which an aircraft capable of autonomously flying can land, acquire aircraft information being information concerning the aircraft flying in a surrounding area of a landing place, and place information being information concerning the landing place; and a determination unit configured to determine a landing priority level for each of the landing places, among aircrafts flying in the surrounding area, based on the aircraft information for each of the aircrafts and the place information for each of the landing places, which are acquired by the acquisition unit.

A landing information determination system according to a third aspect of the present disclosure includes: an acquisition unit configured to, for each of a plurality of landing places each including a facility on which an aircraft capable of autonomously flying can land, acquire aircraft information being information concerning the aircraft flying in a surrounding area of a landing place, and place information being information concerning the landing place; a determination unit configured to determine a landing place for each of the aircrafts and a flight path to the landing place, based on the aircraft information for each of the aircrafts and the place information for each of the landing places, which are acquired by the acquisition unit; and a communication unit configured to transmit information indicating the landing place and the flight path for each of the aircrafts, which are determined by the determination unit, to the corresponding aircraft.

A landing information determination system according to a fourth aspect of the present disclosure includes: an acquisition unit configured to, for each of a plurality of landing places each including a facility on which an aircraft capable of autonomously flying can land, acquire aircraft information being information concerning the aircraft flying in a surrounding area of a landing place, and place information being information concerning the landing place; and a determination unit configured to determine a landing priority level for each of the landing places, among aircrafts flying in the surrounding area, based on the aircraft information for each of the aircrafts and the place information for each of the landing places, which are acquired by the acquisition unit.

A landing information determination method according to a fifth aspect of the present disclosure includes: an acquisition step of, for each of a plurality of landing places each including a facility on which an aircraft capable of autonomously flying can land, acquiring aircraft information being information concerning the aircraft flying in a surrounding area of a landing place, and place information being information concerning the landing place; a determination step of determining a landing place for each of the aircrafts and a flight path to the landing place, based on the aircraft information for each of the aircrafts and the place information for each of the landing places, which are acquired in the acquisition step; and a communication step of transmitting information indicating the landing place and the flight path for each of the aircrafts, which are determined in the determination step, to the corresponding aircraft.

A landing information determination method according to a sixth aspect of the present disclosure includes: an acquisition step of, for each of a plurality of landing places each including a facility on which an aircraft capable of autonomously flying can land, acquiring aircraft information being information concerning the aircraft flying in a surrounding area of a landing place, and place information being information concerning the landing place; and a determination step of determining a landing priority level for each of the landing places, among aircrafts flying in the surrounding area, based on the aircraft information for each of the aircrafts and the place information for each of the landing places, which are acquired in the acquisition step.

A computer-readable medium according to a seventh aspect of the present disclosure is a non-transitory computer-readable medium that stores a program for causing a computer to execute: an acquisition step of, for each of a plurality of landing places each including a facility on which an aircraft capable of autonomously flying can land, acquiring aircraft information being information concerning the aircraft flying in a surrounding area of a landing place, and place information being information concerning the landing place; a determination step of determining a landing place for each of the aircrafts and a flight path to the landing place, based on the aircraft information for each of the aircrafts and the place information for each of the landing places, which are acquired in the acquisition step; and a communication step of transmitting information indicating the landing place and the flight path for each of the aircrafts, which are determined in the determination step, to the corresponding aircraft.

A computer-readable medium according to an eighth aspect of the present disclosure is a non-transitory computer-readable medium that stores a program for causing a computer to execute: an acquisition step of, for each of a plurality of landing places each including a facility on which an aircraft capable of autonomously flying can land, acquiring aircraft information being information concerning the aircraft flying in a surrounding area of a landing place, and place information being information concerning the landing place; and a determination step of determining a landing priority level for each of the landing places, among aircrafts flying in the surrounding area, based on the aircraft information for each of the aircrafts, and the place information for each of the landing places, which are acquired in the acquisition step.

Advantageous Effects of Invention

According to the present disclosure, it is possible to provide a landing information determination apparatus, a system, a method, and a readable medium that enable information concerning landings of a plurality of aircrafts to be changed according to a situation change in a surrounding area of each of a plurality of landing places.

EXAMPLE EMBODIMENT

First Example Embodiment

Figure 1:
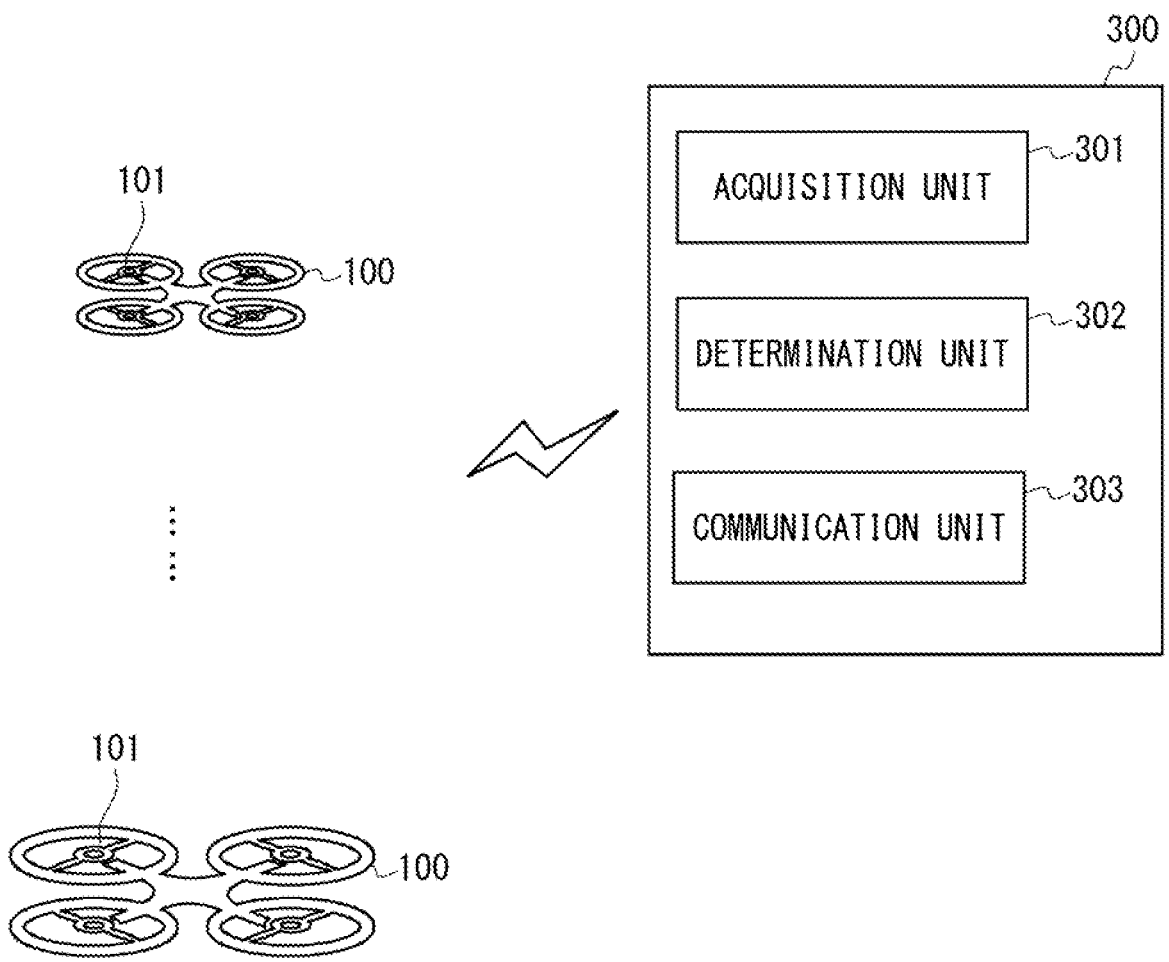
FIG. 1 is a schematic diagram showing a landing information determination system according to a first example embodiment.

A landing information determination system 1 according to a first example embodiment will be described with reference to FIG. 1. FIG. 1 is a diagram schematically showing the landing information determination system 1. The landing information determination system 1 can function as a part of an aircraft system that determines a path of an aircraft. The landing information determination system 1 includes a plurality of aircrafts 100 and a landing information determination apparatus 300. The landing information determination apparatus 300 can be configured as one apparatus, but can also be configured as a distribution system in which functions and processing-target information are distributed among a plurality of apparatuses, and in this case, may be referred to as a landing information determination system.

Each of the aircraft 100 is a rotary-wing aircraft including rotor blades 101. As the rotor blades 101 are rotationally driven, lift and thrust are generated. Note that, Although the aircraft 100 includes four rotor blades 101 in FIG. 1, the number of rotor blades is not limited to any particular number. Further, the plurality of aircraft 100 may be the same type of aircraft (e.g., the same model), or may be different types of aircraft.

Each of the aircraft 100 can autonomously fly. Examples of the aircraft 100 include drones, unmanned aerial vehicles (UAVs: Unmanned Aerial Vehicles), and flying cars (cars), and may have any size and shape. The aircraft 100 may be a vertical take-off and landing (VTOL: Vertical Take-Off and Landing) aircraft or an electric VTOL (eVTOL) aircraft. The aircraft 100 may be a tilt-rotor aircraft. The aircraft 100 may be a helicopter. The aircraft 100 does not need to include rotor blades, and may be one capable of autonomously flying. The aircraft 100 may be an unmanned aircraft loaded with luggage or the like, or may be a manned aircraft in which a crew(s) and/or a passenger(s) are on board.

The aircraft 100 can autonomously fly along a flight path (i.e., a flight route) from a take-off place to a landing place. For example, the aircraft 100 takes off from a take-off and landing facility and flies along a flight path. When the aircraft 100 has flown to the landing place corresponding to the destination, it lands on the landing place. The flight path is a three-dimensional path from the take-off place to the landing place. The take-off place and the landing place are take-off and landing facilities designated in advance. Note that the take-off place and the landing place may be arbitrary places as long as there is an enough space for the landing therein. Needless to say, the take-off and landing facility on which the aircraft lands may be the same as the take-off and landing facility from which the aircraft has taken off. This flight path can be generated in advance by an unillustrated flight path generation apparatus or a flight path generation unit incorporated in the landing information determination apparatus 300.

The aircraft 100 can include a driving unit driven by a secondary battery (battery). In this case, the landing place may include one or a plurality of charging facilities (power supply facilities) for charging the battery. The landing place is defined as a place where a power supply facility exists, and the system can be formed on the condition that one landing place includes only one power supply facility. Alternatively, the system can be formed on the condition that one landing place is allowed to include a plurality of power supply facilities, but also in this case, the system can be formed in such a way as to include position information different per power supply facility.

The landing information determination apparatus 300 according to the present example embodiment is an information processing apparatus of a computer. For example, the landing information determination apparatus 300 is a server apparatus connected to a network such as the Internet. The landing information determining apparatus 300 is not limited to a physically single apparatus. For example, a plurality of processors may perform later-described processes in a cooperative manner.

The landing information determination apparatus 300 according to the present example embodiment includes an acquisition unit 301, a determination unit 302, and a communication unit 303. For each of a plurality of the landing places each including the facility on which the aircraft 100 capable of autonomously flying can land, the acquisition unit 301 acquires aircraft information that is information concerning the aircraft flying in a surrounding area (zone) of the landing place, and place information that is information concerning the landing place. The aircraft information may include an airframe ID such as an identification number for identifying each aircraft (i.e., each airframe). A unique airframe ID is assigned to each of the aircraft 100. The place information is information indicating a place (coordinates) of the take-off and landing facility where the aircraft 100 can take off and land. Acquisition of the aircraft information and the place information can be performed by communication with the aircraft 100 or by communication with the aircraft 100 after radar detection.

Further, the aircraft information preferably includes information of at least one of current coordinates, a flight purpose, a scheduled flight path (including a flight destination), the flight destination, performance, and an airframe state, of the aircraft 100. Since the aircraft information is present for each of the aircrafts 100, it can be said that the number of the aircraft 100 flying inside the surrounding region (zone) of the landing place may also be acquired as the information. The current coordinates can be used for considering a deviation from a current scheduled flight path (scheduled flight plan). The flight purpose may include information such as a priority level of a person and a load.

The information indicating the airframe state preferably includes information of at least one of a failure state, a remaining amount of a power source, a possible longest flight distance, and a possible longest flight time, of the aircraft 100. Here, for example, when power is generated by an electric motor, and the power source is the battery, a remaining amount of the power source corresponds to a charge remaining amount (battery remaining amount), and when power is generated by an internal combustion engine, and the power source is liquid fuel such as gasoline, a remaining amount of the power source corresponds to a remaining amount thereof. Alternatively, when a fuel cell is used as the battery, a remaining amount of fuel such as hydrogen is included in the performance information. When both of an internal combustion engine and an electric motor are used as power, both a battery remaining amount and a fuel remaining amount may be included in the performance information. When a remaining amount of the power source and the performance in the aircraft information exist as the information, a possible longest flight distance and a possible longest flight time can be calculated. In addition, a possible longest flight time and a remaining amount can be calculated based on a possible longest flight distance and the performance, and a possible longest flight distance and a remaining amount can be calculated based on a possible longest flight time and the performance.

The information (performance information) indicating the performance can include data concerning at least one of weight, size, ability as to turning movement, tolerance to wind, maximum flight speed, and maximum flight altitude, of the aircraft 100. Note that A possible longest flight time and a remaining amount of a power source may also be included in the performance information. Further, the performance information may include information indicating whether the aircraft is a manned aircraft or an unmanned aircraft. Furthermore, the performance information may include information indicating whether the aircraft is an emergency aircraft (i.e., emergency airframe) such as a police aircraft, a fire aircraft, or an ambulance aircraft. The acquisition unit 301 may specify the performance information of the aircraft 100 based on the type (e.g., the model) and the airframe ID thereof.

Further, the place information may include information of at least one of coordinates of the landing place (a landing place inside a zone), the current landable number (the number of vacancies) in the landing place, and availability of the landing place of the current landable number. The coordinates of the landing place indicate a place (coordinates) of the take-off and landing facility (take-off and landing port) or a landing facility (landing port). The place information may be an ID indicating the landing place.

The determination unit 302 determines the landing place and a flight path to this landing place for each of the aircrafts 100, based on the aircraft information about each aircraft 100 and the place information about each landing place that are acquired by the acquisition unit 301. In other words, the determination unit 302 performs a determination of the landing place and the flight path, based on the number of aircrafts 100 inside the above-described zone, and the like.

This flight path is a movement path from a current point (i.e., current position) to the landing place. The flight path is information indicating a trajectory that passes through target points (i.e., target positions) of the aircraft 100. Further, a scheduled flight time may be associated with each of the target points in the flight path. The flight path is, for example, composed of a set of three-dimensional coordinates indicating target points. Specifically, the flight path is data in which three-dimensional coordinates are arranged in a chronological order. A flight path is generated by connecting three-dimensional coordinates from one to another.

The determination unit 302 can also determine the flight path, based on, for example, an index (congestion information) indicating the congestion level of the aircrafts 100 in the above-described zone. The determination unit 302 divides the above-described zone (flight area) into a plurality of spaces, calculates, as the congestion information, the number of the aircrafts included simultaneously in each of the spaces, and generates a flight path so that the number of aircraft present in any of the spaces does not exceed a predetermined number. Alternatively, the congestion information may be a value that is determined according to the distance between aircraft. The determination unit 302 generates a flight path so that a distance between one aircraft 100 and another aircraft does not decrease to a certain distance or shorter.

For example, when the possible longest flight time is included as the information indicating an airframe state, the determination unit 302 generates a flight path within the possible longest flight time. Specifically, the determination unit 302 shortens the flight distance for an aircraft 100 of which the possible longest flight time is short, and thereby generates a flight path along which the aircraft 100 can fly without exceeding the possible longest flight time. Needless to say, the determination unit 302 can generate a flight path so as to satisfy performance (i.e., conditions) other than the possible longest flight time.

Furthermore, when the performance information is included in the aircraft information, the determination unit 302 can generate a flight path in such a way as to satisfy performance indicated by the performance information. Furthermore, when the aircraft 100 is an emergency aircraft, the determination unit 302 may preferentially generate a flight path of the aircraft 100 being the emergency aircraft. For example, a flight path is generated in such a way that the aircraft 100 being the emergency aircraft can arrive at a landing place earlier.

As described above, the landing information determination apparatus 300 according to the present example embodiment determines the landing place (allocates the landing place to the aircraft 100), and thus, may be referred to as a landing place determination apparatus or a landing place allocation apparatus.

Furthermore, the above-described determination in the determination unit 302 preferably includes determination of a landing place (vacant port) to be preliminarily made vacant for an emergency or the like. Note that, even when the aircraft 100 to be a determination target of a landing place is driven by a battery, a flight path of the aircraft 100 may also be determined in consideration of a flight path of an aircraft that is not driven by a battery.

Further, the determination unit 302 preferably perform the above-described determination, based on environmental information indicating a flight environment in the above-described surrounding region. The environmental information may include information indicating a flight situation for another aircraft not to be a target of the above-described determination by the determination unit 302. The environmental information may include, for example, weather information about the weather of the flight area.

The environmental information may include, for example, weather information about the weather of the flight area. The weather information may include, for example, rain, fine weather, a wind speed (wind velocity), a wind direction, a precipitation, and the like, and may also include presence and a scale of a typhoon, for example. The environmental information can be acquired for each above-described zone, but may be acquired for each of a plurality of zones and assigned to information about each of the zones. The environmental information may be set as information detected by an own sensor of each of the aircrafts 100 or information acquired by communication with another infrastructure, or information acquired by a control side such as the landing information determination apparatus 300 from a ground infrastructure or a weather radar.

For example, the determination unit 302 can determine the landing place and a flight path so as to avoid a rainy area(s) and/or a windy area(s). In this way, for example, by including the environmental information, the above-described determination can be performed in such a way as to secure many empty ports when an emergency state is more likely to occur. Furthermore, the determination unit 302 may determine the landing place and a flight path, based on the environment information and the performance information. For example, it is assumed that the performance information includes a tolerance to wind. It is assumed that a wind velocity for each area is included as the environmental information. The determination unit 302 generates a flight path so as to avoid an area(s) in which the wind velocity exceeds a flyable wind velocity indicated by the tolerance to wind. Aircraft can be operated more safely and more efficiently. As described above, the determination unit 302 can determine the landing place and a flight path by referring to the environment information and the performance information.

Alternatively, when the weather information changes, the determination unit 302 may change the landing place and a flight path that have been already determined. For example, when bad weather such as heavy rain or strong wind occurs, the determination unit 302 updates the landing place and the flight path so as to avoid the bad weather area(s). Alternatively, when the weather has improved, the area(s) in which aircraft have not been able to fly until then becomes a flyable area(s). In this case, the determination unit 302 updates the landing place and the flight path so as to pass through the new flyable area. In this way, aircraft can be operated more efficiently. In this case, the determination unit 302 can update the landing place and the flight path so as to satisfy the performance (i.e., conditions) such as a tolerance to wind.

Further, when the weather has worsened and a strong wind occurs, the battery remaining amount or the fuel remaining amount may decrease more rapidly than expected. Alternatively, owing to changes in the weather, the battery remaining amount or the fuel remaining amount may decrease more slowly than expected. In such a case, the determination unit 302 may update the landing place and a flight path, based on the performance information indicating the latest battery remaining amount or the latest fuel remaining amount. That is, when the landing information determination apparatus 300 has newly acquired the battery remaining amount or the fuel remaining amount, the determination unit 302 may update the landing place and the flight path.

Further, the above-described another aircraft may include a suspicious aircraft such as a suspicious drone, that is, the environment information may include information indicating the presence/absence of a suspicious aircraft. Examples of the suspicious aircraft include an aircraft of which the airframe ID is not registered in advance. For an aircraft that cannot communicate with the landing information determination apparatus 300 and another control side, the suspicious aircraft can be captured by radar detection or reception of information about the suspicious aircraft from another ground infrastructure. Further, the environmental information may include information indicating the presence/absence of an emergency aircraft. For example, in the flight area, information indicating a place where a suspicious aircraft or an emergency aircraft flies and/or a time of the flight may be used as a part of the environmental information, or may be included in information about" whether an aircraft is suspicious" as a part of aircraft information. Various sensors for detecting the environmental information may be provided. For example, the environment information may be measured by a wind velocity sensor or a rainfall amount sensor. Further, various sensors may be provided in the aircraft 100, so that the environmental information may be acquired from the aircraft 100 at all times or as required.

When information indicating that a suspicious aircraft is flying is acquired as the environment information, the determination unit 302 updates the landing place and the flight path. For example, the determination unit 302 updates the landing place and the flight path so as to avoid an area(s) where the suspicious aircraft exists.

The communication unit 303 transmits the information indicating the landing place and the flight path determined by the determination unit 302 and concerning each of the aircrafts 100, to the corresponding aircraft 100. Here, the communication unit 303 performs processing, for example, in conformity with communication standards such as 5G, 4G, Wi-Fi (registered trademark), and BlueTooth (registered trademark). The communication unit 303 transmits radio signals to aircraft 100 and a terminal(s) 400 (which will be described later). Further, the communication unit 303 receives radio signals from the aircraft 100 and the terminal(s) 400. In this way, data and information can be transmitted and received between the user side such as the aircraft 100 and the server side such as the landing information determination apparatus 300.

Such communication enables each of the aircrafts 100 to set the determined landing place and flight path and autonomously fly on the flight path to the landing place. For example, the landing place can be determined according to landing priority levels (priority levels for urgent landing) among the aircrafts 100, or the like. As one example, for example, by considering a charging remaining amount and a failure state, the aircraft 100 that has a sufficient charging remaining amount and is not in failure can be guided to a farther landing place in case of emergency. Further, by performing a determination of an empty port, an empty facility of power supply for preparing for an emergency can also be secured by such communication.

In fact, since the aircraft 100 requires a power source and the power source has a limit, a landing place may not be able to be used as originally scheduled and may need to be changed according to various situation changes in a surrounding region such as an environmental change in weather and the like, and flying of a suspicious aircraft. In an extreme example, for example, a situation in such a way that all aircrafts need to land at once may also occur. In contrast, in the present example embodiment, landings to both of the unchanged original landing place and the changed landing place can be managed according to such a situation change, and the landing place for each of the aircrafts 100 can be secured in response to a situation change in a surrounding area of each of a plurality of the landing places. Thus, according to the present example embodiment, the information concerning landings of a plurality of the aircrafts can be changed according to a situation change in a surrounding area of each of a plurality of the landing places.

The landing information determination apparatus 300 may be provided at one landing place, and may perform a determination about another landing place. Further, the landing information determination apparatus 300 may be provided at a plurality of landing places. the landing information determination apparatus 300 can determine the landing information for each landing places. However, at one landing place, one landing information determination apparatus 300 dedicated to the landing place may be provided.

Further, the determination unit 302 may also perform the above-described determination by the determination unit 302 by using a learned model that inputs the information acquired by the acquisition unit 301 and outputs a result of the above-described determination by the determination unit 302. A type and an algorithm of the learned model are not limited, but, particularly, a prediction-based model can be suitably used.

Further, the above-described determination by the determination unit 302 may be performed when a landing request that specifies a landing place is received by the communication unit 303 from one or more aircrafts 100. Alternatively, the above-described determination by the determination unit 302 may be performed when a request for landing on a landing place that is not present in a scheduled flight path is received by the communication unit 303 from one or more aircrafts 100.

As in this example, the determination unit 302 may dynamically generate the landing place and the flight path. For example, when the landing information determination apparatus 300 acquires new information, the landing place and flight path that have already been determined are changed. Thereby, the landing place and the flight path of the aircraft 100 in flight are updated. Then, the landing information determination apparatus 300 transmits the updated landing place and flight path to the aircraft 100 during flying. The aircraft 100 receives the updated landing place and flight path. Thus, the aircraft 100 flies in accordance with the newly updated landing place and flight path. In this way, the plurality of aircrafts 100 can be operated more efficiently.

Figure 2:
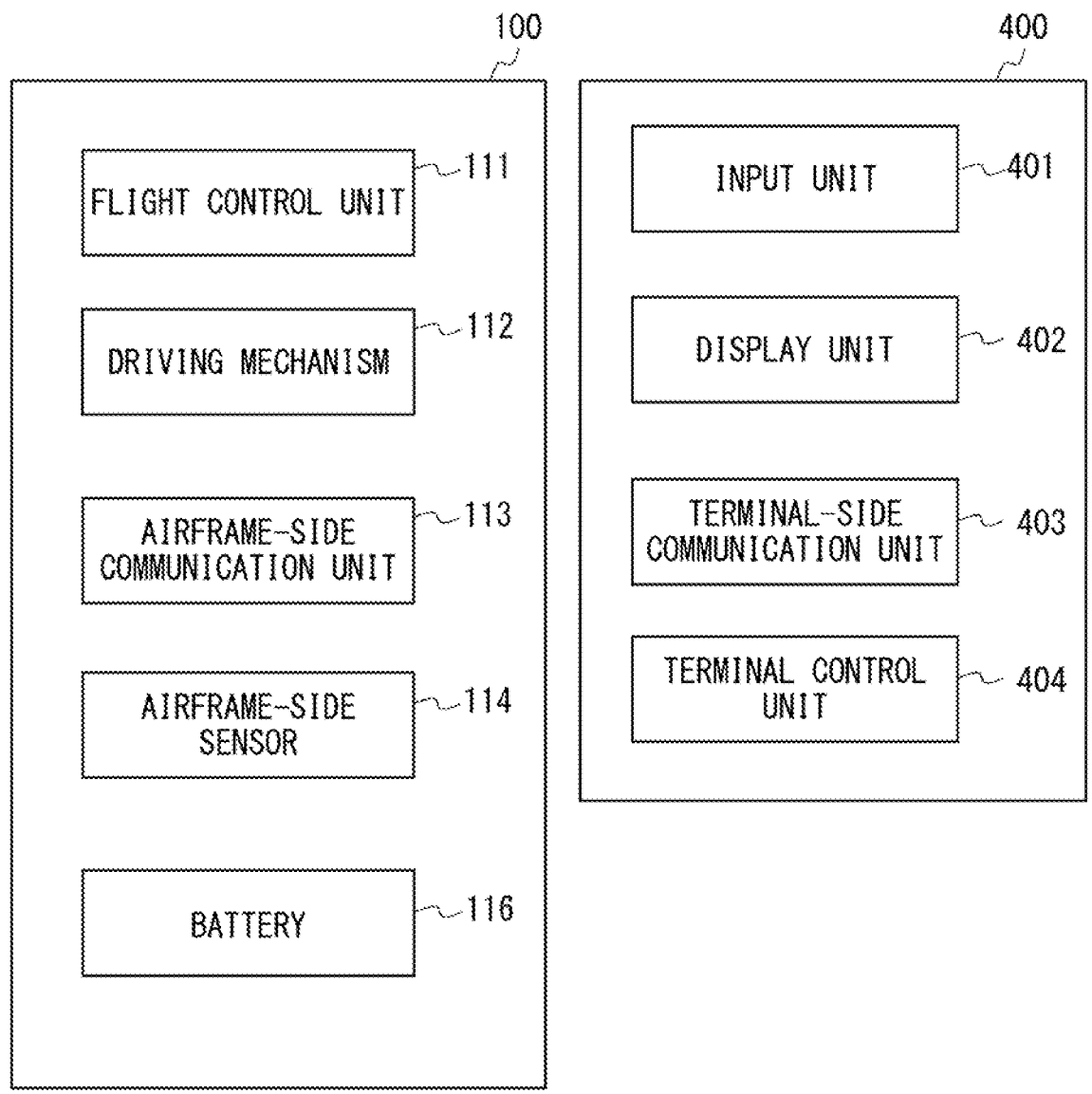
FIG. 2 is a control block diagram of the landing information determination system.

Next, configurations of the aircraft 100 and the terminal 400 will be described. FIG. 2 is a function block diagram showing configurations of the aircraft 100 and the terminal 400. The terminal 400 is an apparatus through which the user or the like of the aircraft 100 enters necessary information. The terminal 400 is, for example, an information processing apparatus such as a smartphone or a personal computer. The terminal 400 includes an input unit 401, a display unit 402, a terminal-side communication unit 403, and a terminal control unit 404. Note that at least some of the processes performed by the terminal 400 may be performed by a processor or the like provided in the aircraft 100. Further, the terminal 400 may be disposed in the aircraft 100.

The input unit 401 includes an input device such as a touch panel, a keyboard, a mouse, and a voice input microphone, and receives inputs from the user. For example, the user enters a destination (which includes the case where the destination is the received landing place that has been determined), a scheduled take-off time point, and the like by operating the input unit 401. Further, the user may enter an intermediate point(s) or the like between the take-off place and the landing place by operating the input unit 401. The display unit 402 includes a display device and displays a window through which the user enters instructions.

The terminal-side communication unit 403 wirelessly communicates with the aircraft 100 and the landing information determination apparatus 300. In this way, movement information such as a destination and a scheduled take-off time is transmitted to the aircraft 100 or to the landing information determination apparatus 300. The terminal control unit 404 controls each component. For example, the terminal control unit 404 includes a processor and a memory. The terminal control unit 404 controls each block by executing a control program stored in the memory.

The aircraft 100 includes a flight control unit 111, a driving mechanism 112, an airframe-side communication unit 113, an airframe-side sensor(s) 114, and a battery 116.

The flight control unit 111 controls each component. For example, the driving mechanism 112 includes rotor blades 101 and a motor therefor, and generates lift and thrust necessary for flight. The flight control unit 111 outputs a drive signal for controlling the driving mechanism 112. In the example shown in FIG. 1, the flight control unit 111 controls the driving mechanism 112 so that the driving mechanism 112 independently drives four rotor blades 101. The flight control unit 111 controls the driving mechanism 112 so that the aircraft 100 autonomously flies to the landing place. The aircraft 100 flies along a flight path.

For example, the flying control unit 111 stores, in the memory and the like, the flight path received by the flight path generation apparatus that is not illustrated. The flight control unit 111 controls the driving mechanism 112 so that a flight is performed along the flight path received from the landing information determination apparatus 300. For example, the flight control unit 111 controls the driving mechanism 112 so that the position of the own aircraft moves along the flight path. When the position of the own aircraft is deviated from the flight path due to wind or the like, the aircraft 100 flies so as to get close to the flight path. The position of the own aircraft can be detected by the airframe-side sensor 114, when information indicating the landing place and the flight path is received from the landing information determination apparatus 300, the flight path in the above-described memory may be updated.

The airframe-side communication unit 113 wirelessly communicates with a ground side, i.e., with the landing information determination apparatus 300 and the terminal 400. The airframe-side communication unit 113 performs processing, for example, in conformity with communication standards such as 5G, 4G, Wi-Fi (registered trademark), and BlueTooth (registered trademark). The airframe-side communication unit 113 transmits radio signals to the ground side. The airframe-side communication unit 113 receives radio signals from the ground side. In this way, data and information can be transmitted and received between the aircraft 100 and the ground side. The Communication between the landing information determination apparatus 300 and the terminal 400 may be wire communication. The airframe-side communication unit 113 receives the landing place and the flight path from the landing information determination apparatus 300.

The airframe-side sensor 114 detects information about the flight state of the aircraft 100.
The airframe-side sensor 114 includes, for example, a gyro sensor that detects the attitude of the airframe. Further, the airframe-side sensor 114 may include a positioning sensor that detects the position (the above-described current coordinates) of the own aircraft. As the positioning sensor, for example, a satellite positioning sensor such as a GPS may be used. A flight point (i.e., flight position) of the aircraft 100 in flight can be transmitted by using automatic dependent surveillance-broadcast (ADS-B), for example. Further, the airframe-side sensor 114 may detect obstacles and other aircraft near the own aircraft. Furthermore, the airframe-side sensor 114 may detect information concerning a failure state of the aircraft 100. The flight control unit 111 controls the driving mechanism 112 based on the result of the detection by the airframe-side sensor 114. In this way, the aircraft 100 can autonomously fly along the flight path from the take-off place (i.e., take-off position) or a current point to the landing place (i.e., landing position). The airframe-side sensor 114 is not limited to one sensor, and may include a plurality of sensors. The battery 116 supplies electric power to each apparatus (i.e., to each unit). The aircraft 100 is autonomously flying along the flight path.

Further, the determination unit 302 may generate a plurality of flight paths for one aircraft 100. The communication unit 304 transmits a plurality of flight paths to the terminal 400 or the aircraft 100 as flight path candidates. The landing information determination apparatus 300 presents (i.e., shows) the plurality of flight path candidates to the user. The display unit 402 of the terminal 400 displays the flight path candidates. The display unit 402 may present flight paths to the user through AR (Augmented Reality) display or VR (Virtual Reality) display. For example, the display unit 402 displays flight paths on a head-mounted display or the like. Alternatively, the display unit 402 may perform AR display by projecting a display image including flight paths onto the windshield or the like. Then, the user selects one of a plurality of displayed flight path candidates by operating the input unit 401. The flight path candidate selected by the user is stored as the flight path in the memory in the aircraft 100.

In the above-described description, the landing information determination apparatus 300 performs various types of processing and the like, but the aircraft 100 and the terminal 400 may perform at least a part of the processing.

Figure 3:
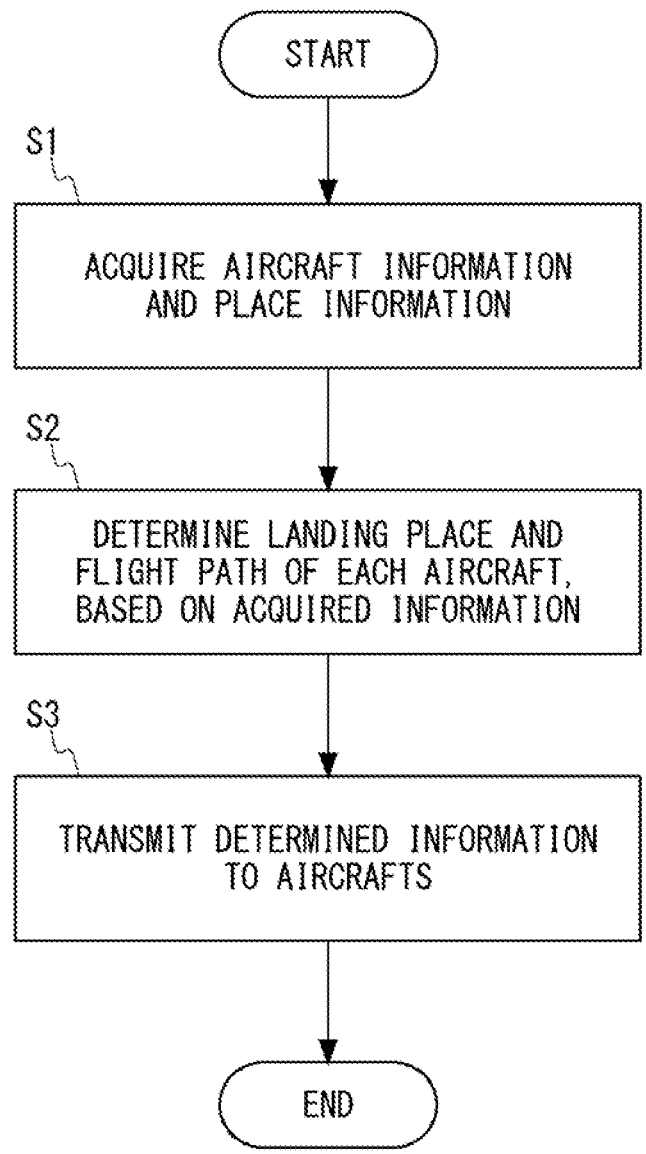
FIG. 3 is a flowchart for illustrating a landing information determination method according to the first example embodiment.

Next, a landing information determination method according to the first example embodiment will be described with reference to FIG. 3. FIG. 3 is a flowchart for illustrating the landing information determination method according to the first example embodiment. The landing information determination method according to the present example embodiment acquires the aircraft information and the place information (step S1), determines the landing place and the flight path of each of the aircrafts, based on the acquired information (step S2), and transmits the determined information to the aircrafts (step S3). The steps S1, S2 and S3 may be referred to as an acquisition step, a determination step, and a communication step, respectively. In step S1, for each of a plurality of the landing places each including the facility on which the aircraft capable of autonomously flying can land, the aircraft information that is information concerning the aircraft flying in a surrounding area of the landing place, and the place information that is information concerning the landing place are acquired. In step S2, the landing place and the flight path to this landing place for each of the aircrafts are determined based on the aircraft information acquired at the step S1 and concerning each of the aircrafts, and the place information acquired at the step S1 and concerning each of the landing places. In step S3, the information determined at the step S2 and indicating the landing place and the flight path of each of the aircrafts, is transmitted to the corresponding aircraft. Note that other examples are as described above.

Other Example Embodiments

Figure 4:
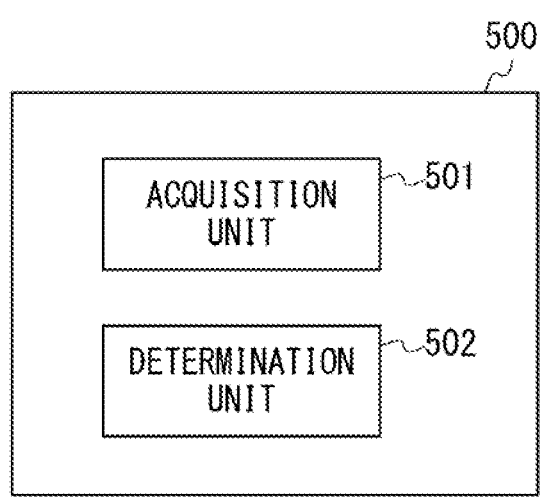
FIG. 4 is a schematic diagram showing a landing information determination apparatus according to an additional example embodiment.

A landing information determination apparatus 500 according to an additional example embodiment will be described with reference to FIG. 4. The landing information determination apparatus 500 is different from the landing information determination apparatus 300 in a determination content, and is an apparatus that determines a landing priority level of each the aircrafts 100. Thus, the landing information determination apparatus according to the present example embodiment may be referred to as a landing priority level determination apparatus.

The landing information determination apparatus 500 includes an acquisition unit 501 and a determination unit 502. The acquisition unit 501 acquires, for each of a plurality of the landing places each including the facility on which the aircraft capable of autonomously flying can land, the aircraft information that is information concerning the aircraft 100 flying in a surrounding area of the landing place, and the place information that is information concerning the landing place. The determination unit 502 performs a determination of landing priority levels for each of the landing places, among the aircrafts flying in the above-described surrounding area, based on the aircraft information about each aircraft and the place information about each landing place that are acquired by the acquisition unit 501.

Further, an application example of each piece of information used for a determination and a determination content described in the first example embodiment can also be applied to the present example embodiment. Further, also in the present example embodiment, the landing information determination apparatus 500 may be formed as one apparatus, but may also be formed as a distributed system in which a function, information about a processing target, and the like are distributed in a plurality of apparatuses, and, in this case, the landing information determination apparatus 500 may be referred to as a landing information determination system.

According to the landing information determination apparatus 500 of the present example embodiment, by the configuration as described above, information indicating landing priority levels of a plurality of the aircrafts 100 can be changed according to a situation change in a surrounding area of each of a plurality of the landing places.

In the present example embodiment, an advantageous effect similar to that in the first example embodiment can be achieved by separately providing, in the system, an apparatus that determines the landing place and the flight path thereto, based on landing priority levels output by the landing information determination apparatus (landing priority level determination apparatus) 500.

Figure 5:
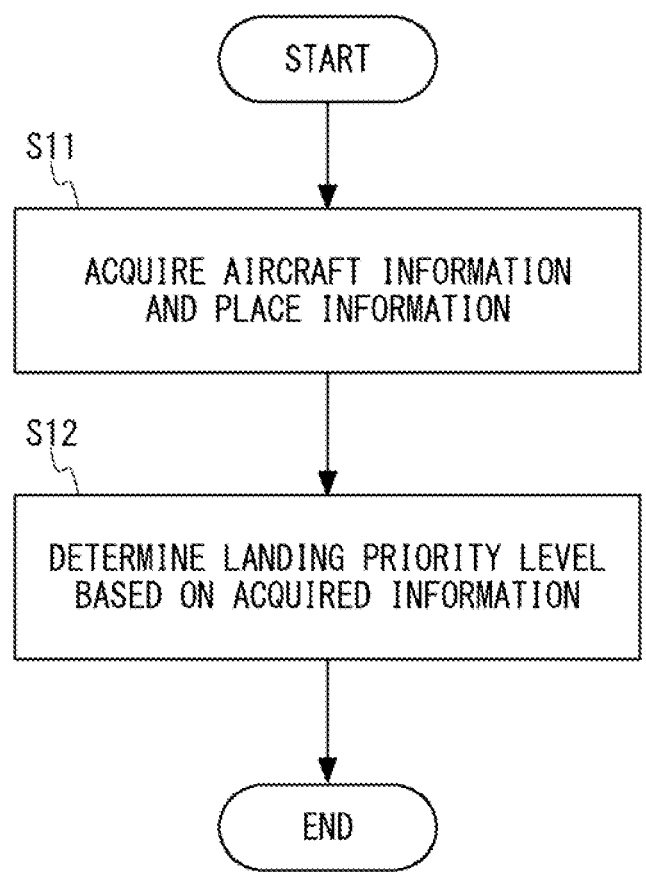
FIG. 5 is a flowchart for illustrating a landing information determination method according to the additional example embodiment.

Next, a landing information determination method according to the present example embodiment will be described with reference to FIG. 5. FIG. 5 is a flowchart for illustrating the landing information determination method according to the additional example embodiment. The landing information determination method according to the present example embodiment acquires the aircraft information and the place information (step S11) similarly to the step S1, and determines landing priority levels, based on the acquired information (step S12). The step S12 may be referred to as a determination step. The step S12 determines landing priority levels for each of the landing places, among the aircrafts flying in the above-described surrounding area, based on the aircraft information acquired at the step S11 and concerning each of the aircrafts and the place information acquired at the step S11 and concerning each of the landing places. Note that other examples are as described above.

<Example of Hardware Configuration>

Figure 6:
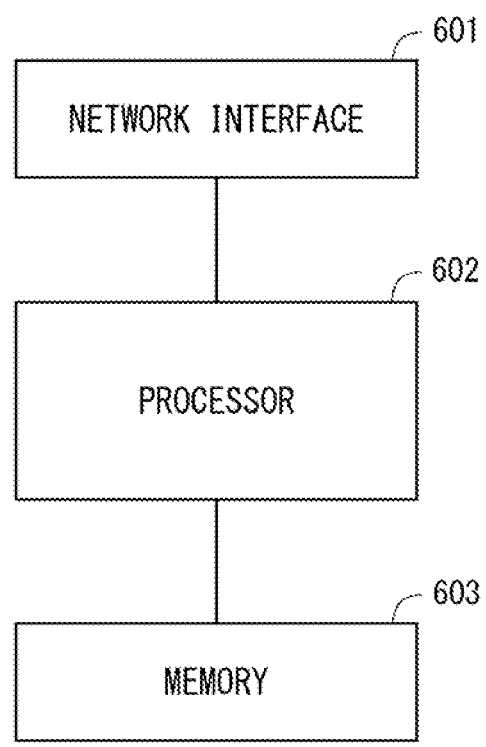
FIG. 6 is a block diagram showing a hardware configuration example.

An example of a hardware configuration of an apparatus according to the first example embodiment or other example embodiments will be described. FIG. 6 is a block diagram showing an example of a hardware configuration for performing information processing in each of the landing information determination apparatuses 300 and 500, the terminal 400, and the aircraft 100. Referring to FIG. 6, the landing information determination apparatus 300 and the like each include a network interface 601, a processor 602, and a memory 603. The network interface 601 is used to communicate with a network node (e.g., an eNB, an MME, or a P-GW). The network interface 601 may include, for example, a network interface card (NIC) in conformity with IEEE 802.3 series. Note that the eNB represents an evolved node B, the MME represents a mobility management entity, and the P-GW represents a packet data network gateway. The IEEE stands for Institute of Electrical and Electronics.

The processor 602 loads software (a computer program) from the memory 603 and executes the loaded software, so that the processor 602 performs the processes performed by the landing information determination apparatus 300 or the like described in each of the above-described example embodiments. The processor 602 may be, for example, a microprocessor, an MPU, or a CPU. The processor 602 may include a plurality of processors.

The memory 603 is composed of a combination of a volatile memory and a nonvolatile memory. The memory 603 may include a storage remotely located from the processor 602. In this case, the processor 602 may access the memory 603 through an I/O (Input/Output) interface (not shown).

In the example shown FIG. 6, the memory 603 is used to store a group of software modules. The processor 602 loads the group of software modules (a computer program(s)) from the memory 603 and executes the loaded software modules, so that the processor 602 can perform the processes performed by the landing information determination apparatus 300 or the like described in each of the above-described example embodiments.

As described above with reference to FIG. 6, each of the processors included in the landing information determination apparatus 300 and the like in each of the above-described example embodiments executes one or a plurality of programs including a set of instructions for causing a computer to perform the algorithm described above with reference to the drawings.

In the above-described examples, the program can be stored and provided to a computer using any type of non-transitory computer readable media. Non-transitory computer readable media include any type of tangible storage media. Examples of the non-transitory computer readable media include magnetic storage media (floppy disks, magnetic tapes, hard disk drives), optical magnetic storage media (e.g., magneto-optical disks). Moreover, this example includes CD-ROM (Read Only Memory), CD-R, CD-R/W. Moreover, this example includes semiconductor memories (e.g., mask ROM, PROM (programmable ROM), EPROM (erasable PROM), flash ROM, and RAM (Random Access Memory)). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Furthermore, in each of the example embodiments described above, as illustrated by exemplifying the procedure of the landing information determination method in the landing information determination apparatus, the present disclosure may also take the form of the following first or second landing information determination method. The first landing information determination method may include an acquisition step, a determination step, and a communication step corresponding to the steps S1, S2, and S3 in FIG. 3, respectively. The second landing information determination method may include the acquisition step and a determination step corresponding to the steps S11 and S12 in FIG. 5, respectively. Note that other examples are as described in each of the example embodiments described above. Further, it can be said that the above-described program is a program for causing a computer (or a computer for control included in the landing information determination apparatus) to perform each step in the first or second landing information determination method as described above.

Note that the present disclosure is not limited to the above-described example embodiments, and they may be modified as appropriate without departing from the scope and spirit of the disclosure.

Although the present invention has been described with reference to example embodiments (and examples), the present invention is not limited to the above-described example embodiments (and examples). The configuration and details of the present invention may be modified within the scope of the present invention in various ways that can be understood by those skilled in the art.

The whole or part of the example embodiments disclosed above can be described as, but not limited to, the following Supplementary Notes.

(Supplementary Note 1)

A landing information determination apparatus comprising:
- an acquisition unit configured to, for each of a plurality of landing places each including a facility on which an aircraft capable of autonomously flying can land, acquire aircraft information being information concerning the aircraft flying in a surrounding area of a landing place, and place information being information concerning the landing place;
- a determination unit configured to determine a landing place for each of the aircrafts and a flight path to the landing place, based on the aircraft information for each of the aircrafts, and the place information for each of the landing places, which are acquired by the acquisition unit; and
- a communication unit configured to transmit information indicating the landing place and the flight path for each of the aircrafts, which are determined by the determination unit, to the corresponding aircraft.

(Supplementary Note 2)

The landing information determination apparatus according to Supplementary note 1, wherein the determination unit performs the determination, based on environment information indicating a flight environment in the surrounding area.

(Supplementary Note 3)

The landing information determination apparatus according to Supplementary note 2, wherein the environment information includes information indicating a flight situation of another aircraft that is not a target of the determination.

(Supplementary Note 4)

The landing information determination apparatus according to Supplementary note 3, wherein the another aircraft includes a suspicious aircraft.

(Supplementary Note 5)

The landing information determination apparatus according to any one of Supplementary notes 1 to 4, wherein the determination includes determination of a landing place to be preliminarily made vacant.

(Supplementary Note 6)

The landing information determination apparatus according to any one of Supplementary notes 1 to 5, wherein the aircraft information includes information of at least one of current coordinates, a flight purpose, a scheduled flight path, a flight destination, performance, and an airframe state, of the aircraft.

(Supplementary Note 7)

The landing information determination apparatus according to Supplementary note 6, wherein the information indicating the airframe state includes information of at least one of a failure state, a remaining amount of a power source, a possible longest flight distance, and a possible longest flight time, of the aircraft.

(Supplementary Note 8)

The landing information determination apparatus according to any one of Supplementary notes 1 to 7, wherein the place information includes information of at least one of coordinates, a current landable number, and availability, of the landing place.

(Supplementary Note 9)

The landing information determination apparatus according to any one of Supplementary notes 1 to 8, wherein the determination unit performs the determination when the communication unit receives, from the aircraft, a landing request designating the landing place.

(Supplementary Note 10)

The landing information determination apparatus according to any one of Supplementary notes 1 to 9, wherein the determination unit performs the determination by using a learned model of inputting information acquired by the acquisition unit and outputting a result of the determination.

(Supplementary Note 11)

The landing information determination apparatus according to any one of Supplementary notes 1 to 10, wherein the aircraft includes a driving unit driven by a secondary battery.

(Supplementary Note 12)

The landing information determination apparatus according to Supplementary note 11, wherein the landing place includes a charging facility that charges the secondary battery.

(Supplementary Note 13)

A landing information determination apparatus comprising:
- an acquisition unit configured to, for each of a plurality of landing places each including a facility on which an aircraft capable of autonomously flying can land, acquire aircraft information being information concerning the aircraft flying in a surrounding area of a landing place, and place information being information concerning the landing place; and
- a determination unit configured to determine a landing priority level for each of the landing places, among aircrafts flying in the surrounding area, based on the aircraft information for each of the aircrafts, and the place information for each of the landing places, which are acquired by the acquisition unit.

(Supplementary Note 14)

A landing information determination system comprising:
- an acquisition unit configured to, for each of a plurality of landing places each including a facility on which an aircraft capable of autonomously flying can land, acquire aircraft information being information concerning the aircraft flying in a surrounding area of a landing place, and place information being information concerning the landing place;

a determination unit configured to determine a landing place for each of the aircrafts and a flight path to the landing place, based on the aircraft information for each of the aircrafts, and the place information for each of the landing places, which are acquired by the acquisition unit; and a communication unit configured to transmit information indicating the landing place and the flight path for each of the aircrafts, which are determined by the determination unit, to the corresponding aircraft.

(Supplementary Note 15)

A landing information determination system comprising:

an acquisition unit configured to, for each of a plurality of landing places each including a facility on which an aircraft capable of autonomously flying can land, acquire aircraft information being information concerning the aircraft flying in a surrounding area of a landing place, and place information being information concerning the landing place; and a determination unit configured to determine a landing priority level for each of the landing places, among aircrafts flying in the surrounding area, based on the aircraft information for each of the aircrafts, and the place information for each of the landing places, which are acquired by the acquisition unit.

(Supplementary Note 16)

A landing information determination method comprising:

an acquisition step of, for each of a plurality of landing places each including a facility on which an aircraft capable of autonomously flying can land, acquiring aircraft information being information concerning the aircraft flying in a surrounding area of a landing place, and place information being information concerning the landing place;

a determination step of determining a landing place for each of the aircrafts and a flight path to the landing place, based on the aircraft information for each of the aircrafts, and the place information for each of the landing places, which are acquired in the acquisition step; and a communication step of transmitting information indicating the landing place and the flight path for each of the aircrafts, which are determined in the determination step, to the corresponding aircraft.

(Supplementary Note 17)

A landing information determination method comprising:

an acquisition step of, for each of a plurality of landing places each including a facility on which an aircraft capable of autonomously flying can land, acquiring aircraft information being information concerning the aircraft flying in a surrounding area of a landing place, and place information being information concerning the landing place; and a determination step of determining a landing priority level for each of the landing places, among aircrafts flying in the surrounding area, based on the aircraft information for each of the aircrafts, and the place information for each of the landing places, which are acquired in the acquisition step.

(Supplementary Note 18)

A non-transitory computer-readable medium that stores a program for causing a computer to execute:

an acquisition step of, for each of a plurality of landing places each including a facility on which an aircraft capable of autonomously flying can land, acquiring aircraft information being information concerning the aircraft flying in a surrounding area of a landing place, and place information being information concerning the landing place;

a determination step of determining a landing place for each of the aircrafts and a flight path to the landing place, based on the aircraft information for each of the aircrafts, and the place information for each of the landing places, which are acquired in the acquisition step; and a communication step of transmitting information indicating the landing place and the flight path for each of the aircrafts, which are determined in the determination step, to the corresponding aircraft.

(Supplementary Note 19)

A non-transitory computer-readable medium that stores a program for causing a computer to execute:

an acquisition step of, for each of a plurality of landing places each including a facility on which an aircraft capable of autonomously flying can land, acquiring aircraft information being information concerning the aircraft flying in a surrounding area of a landing place, and place information being information concerning the landing place; and a determination step of determining a landing priority level for each of the landing places, among aircrafts flying in the surrounding area, based on the aircraft information for each of the aircrafts, and the place information for each of the landing places, which are acquired in the acquisition step.

REFERENCE SIGNS LIST

100 AIRCRAFT
101 ROTOR BLADE
111 FLIGHT CONTROL UNIT
112 DRIVING MECHANISM
113 AIRFRAME-SIDE COMMUNICATION UNIT
114 AIRFRAME-SIDE SENSOR
116 BATTERY
300, 500 LANDING INFORMATION DETERMINATION APPARATUS
301, 501 ACQUISITION UNIT
302, 502 DETERMINATION UNIT
303 COMMUNICATION UNIT
400 TERMINAL
401 INPUT UNIT
402 DISPLAY UNIT
403 TERMINAL-SIDE COMMUNICATION UNIT
404 TERMINAL CONTROL UNIT

What is claimed is:

1. A landing information determination apparatus comprising a communication interface, at least one memory storing instructions, and at least one processor configured to execute the instructions to:

for each of a plurality of landing places each including a facility on which an aircraft capable of autonomously flying can land, acquire aircraft information being information concerning the aircraft flying in a surrounding area of a landing place, place information being information concerning the landing place, and environment information indicating a flight environment in the surrounding area, determine the landing place for each of the aircrafts and a flight path to the landing place, based on the aircraft information for each of the aircrafts, the place information for each of the landing places, and the environment information for each of the landing places; and transmit information indicating the landing place and the flight path for each of the aircrafts, which are determined, to the corresponding aircraft via the communication interface, wherein the aircraft information includes information indicating a priority level of a person on board the aircraft and a priority level of a load loaded on the aircraft, and the environment information includes information indicating a flight situation of another aircraft that is not a target of the determination.

2. The landing information determination apparatus according to claim 1, wherein the another aircraft includes a suspicious aircraft.

3. The landing information determination apparatus according to claim 1, wherein the at least one processor is to determine the landing place to be preliminarily made vacant.

4. The landing information determination apparatus according to claim 1, wherein the aircraft information includes information of at least one of current coordinates, a scheduled flight path, a flight destination, performance, and an airframe state, of the aircraft.

5. The landing information determination apparatus according to claim 4, wherein the information indicating the airframe state includes information of at least one of a failure state, a remaining amount of a power source, a possible longest flight distance, and a possible longest flight time, of the aircraft.

6. The landing information determination apparatus according to claim 1, wherein the place information includes information of at least one of coordinates, a current landable number, and availability, of the landing place.

7. The landing information determination apparatus according to claim 1, wherein the at least one processor is to determine the landing place and the flight path when the communication interface receives, from the aircraft, a landing request designating the landing place.

8. The landing information determination apparatus according to claim 1, wherein the at least one processor is to determine the landing place and the flight path by using a learned model of inputting acquired information and outputting a result of determining the landing place and the flight path.

9. The landing information determination apparatus according to claim 1, wherein the aircraft is driven by a secondary battery.

10. The landing information determination apparatus according to claim 9, wherein the landing place includes a charging facility that charges the secondary battery.

11. A landing information determination method comprising:

for each of a plurality of landing places each including a facility on which an aircraft capable of autonomously flying can land, acquiring aircraft information being information concerning the aircraft flying in a surrounding area of a landing place, place information being information concerning the landing place, and environment information indicating a flight environment in the surrounding area;

determining the landing place for each of the aircrafts and a flight path to the landing place, based on the aircraft information for each of the aircrafts, the place information for each of the landing places, and the environment information for each of the landing places; and transmitting information indicating the landing place and the flight path for each of the aircrafts, which are determined in the determining, to the corresponding aircraft, wherein the aircraft information includes information indice priority level of a person on board the aircraft and a priority level of a load loaded on the aircraft, and the environment information includes information indicating a flight situation of another aircraft that is not a target of the determination.

12. A non-transitory computer-readable medium that stores a program for causing a computer to execute:

for each of a plurality of landing places each including a facility on which an aircraft capable of autonomously flying can land, acquiring aircraft information being information concerning the aircraft flying in a surrounding area of a landing place, place information being information concerning the landing place, and environment information indicating a flight environment in the surrounding area;

determining the landing place for each of the aircrafts and a flight path to the landing place, based on the aircraft information for each of the aircrafts, the place information for each of the landing places, and the environment information for each of the landing places; and transmitting information indicating the landing place and the flight path for each of the aircrafts, which are determined in the determining, to the corresponding aircraft, wherein the aircraft information includes information indicating a priority level of a person on board the aircraft and a priority level of a load loaded on the aircraft; and the environment information includes information indicating a flight situation of another aircraft that is not a target of the determination.

* * * * *